United States Patent [19]
Betts et al.

[11] Patent Number: 5,481,567
[45] Date of Patent: Jan. 2, 1996

[54] METHOD AND APPARATUS FOR AUTOMATICALLY ADAPTING THE AMOUNT OF WARPING IN A SYSTEM TRANSMITTING INFORMATION THROUGH A NON-LINEAR CHANNEL

[75] Inventors: William L. Betts, St. Petersburg; Edward S. Zuranski, Largo, both of Fla.

[73] Assignee: AT&T Corp., Murray Hill, N.J.

[21] Appl. No.: 304,715

[22] Filed: Sep. 12, 1994

[51] Int. Cl.$^6$ .............................. H04L 5/12; H04L 23/02
[52] U.S. Cl. ........................... 375/261; 375/265; 371/43; 341/4
[58] Field of Search ................................ 341/4; 371/37.1, 371/43; 375/261, 262, 265, 222

[56] References Cited

U.S. PATENT DOCUMENTS

| | | |
|---|---|---|
| 5,115,453 | 5/1992 | Calderbank et al. . |
| 5,265,127 | 11/1993 | Betts et al. . |
| 5,343,500 | 8/1994 | Betts et al. ............................ 375/262 |

OTHER PUBLICATIONS

Kalet et al, "QAM Transmission Through a Companding Channel–Signal Constellations and Detections", IEEE Trans. on Communications, vol. 42 No. 2/3/4 Feb./Mar./Apr. 1994 pp. 417–429.

Betts, W., "Nonlinear Encoding by Surface Projection," International Conference on Data Transmission, Conference Publication No. 356, Savoy Place, London, England, Sep. 23–25, 1992, 6 pages.

*Primary Examiner*—Stephen Chin
*Assistant Examiner*—Bryan E. Webster

[57] ABSTRACT

The present invention discloses an improvement over existing techniques for transmitting data over voice-band telephone channels by automatically adapting the amount of warping or compression that is applied to a sequence of signal points. A sequence of warped signal points, each of which is related to a respective signal point of a predetermined base constellation according to a warp function, is received in a decoder via a transmission channel having a non-linear component. After each of the received signal points is unwarped using substantially an inverse of the warp function, the average dispersions of the received inner and outer signal points about corresponding sequences of expected signal points are calculated. The difference between the average dispersion of the inner and outer points is then computed and used to update the amount of warping or compression in order to further minimize the effects of the channel non-linearity. The desired amount of warping is communicated to the transmitting encoder.

25 Claims, 3 Drawing Sheets

1

METHOD AND APPARATUS FOR AUTOMATICALLY ADAPTING THE AMOUNT OF WARPING IN A SYSTEM TRANSMITTING INFORMATION THROUGH A NON-LINEAR CHANNEL

FIELD OF THE INVENTION

The present invention relates generally to the transmission of data and, in particular, to the transmission of data over voice-band telephone channels using modems.

BACKGROUND OF THE INVENTION

Present telephone networks are evolving toward the almost exclusive use of digital carrier systems. At the heart of such systems are non-linear analog-to-digital (A/D) converters which encode analog voice and modem signals for digital transmission. A common D4 channel bank, for example, uses 64 kilo-bit per second (KBPS) pulse code modulation (PCM). Similarly, many systems designed for voice transmission use 32 KBPS adaptive differential PCM, or ADPCM.

It is desirable to be able to use the full capacity of a channel in transmitting data over the voice-band telephone network using analog modems. Non-linearities in such systems, however, serve as a limit on the maximum bit rate that analog modems can obtain while still maintaining a commercially acceptable error rate. This limitation is primarily due to the multiplicative effect that the non-linearities have on signals transmitted through the channel, such as PCM quantization noise, and on intermodulation distortion.

One technique and system for improving the performance of data transmission via a transmission channel in the presence of multiplicative noise is disclosed in U.S. Pat. No. 5,265,127, entitled "Non-linear Encoder and Decoder For Information Transmission Through Non-linear Channels," which is assigned to the assignee of the present invention and which is incorporated by reference herein. FIGS. 1 and 2 are, respectively, block diagrams of the modem transmitter and modem receiver disclosed in the aforementioned patent. The invention disclosed in the above-referenced patent uses a signal constellation which is arrived at by starting with a base constellation whose signal points and whose geometry are selected in accordance with conventional criteria. The base constellation is warped by adjusting the positions of its signal points according to a warp function which models the inverse of a non-linear characteristic of the transmission channel and which is known a priori. The warped signal points are then transmitted to a receiver where the inverse of the warp function is applied to the received signal points prior to processing them in a Viterbi decoder. As a result, the amount of distortion to the transmitted signal points due to the non-linear characteristic of the channel is reduced, and, in particular, the amount of distortion for points near the perimeter of the signal constellation is reduced. The Viterbi decoder can then use the standard, unmodified Viterbi decoding algorithm. One embodiment of the non-linear encoder has been incorporated into the V.34 modem standard and the V.32 Terbo standard.

The warp function typically depends upon the magnitude of the transmitted signal. Another independent factor in the warp function is a warp factor g which is selected as a function of the degree to which it is desired to warp or compress the overall base constellation prior to transmission. The desired degree of warping depends, in turn, upon the non-linear component of the transmission channel. A particular value of the warp factor g depends upon the application and may be pre-set in the transmitter and receiver based upon the expected characteristics of the channel. It is desirable, however, to be able to adapt the warp factor g to account for changes in the non-linear characteristics of the channel that may occur over time.

SUMMARY OF THE INVENTION

The present invention discloses a data recovery apparatus for recovering data from a sequence of warped signal points received from a transmitter via a non-linear transmission channel, where each of the warped signal points is related to a respective signal point of a predetermined base constellation in accordance with a warp function having a warp factor as an independent variable. The apparatus comprises components for unwarping each of the received signal points using substantially an inverse of the warp function. It further comprises components for computing the ratio of the average dispersion of unwarped signal points related to outer signal points of the constellation and the average dispersion of unwarped signal points to related inner signal points of the constellation. The apparatus also has components for updating the value of the warp factor used by the unwarping components according to the ratio computed by the computing components. In addition, the apparatus comprises components for communicating the updated value of the warp factor to the transmitter.

Other features and advantages of the present invention will be readily apparent by reference to the following detailed description and accompanying drawings.

DETAILED DESCRIPTION OF THE PRESENT INVENTION

Figure 3:
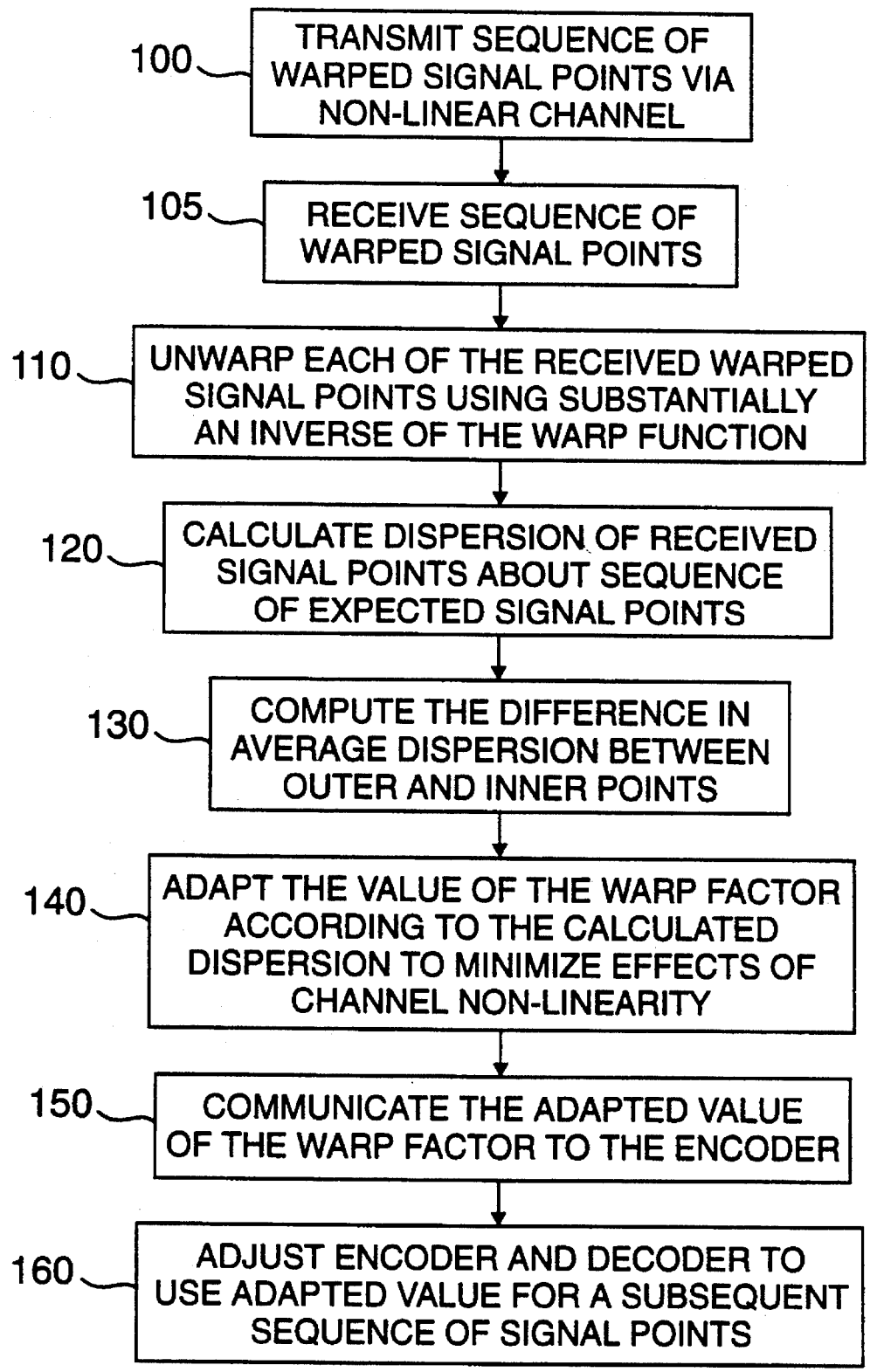
FIG. 3 is a flow diagram showing the basic steps according to one embodiment of the method of the present invention.

FIG. 3 is a flow diagram showing the basic steps in the method of the present invention. As shown in step 100, a sequence of warped signal points is transmitted via a transmission channel having a non-linear component. The warped signal points may be generated by an encoder in a transmitter modem, where each of the warped signal points is related to a respective signal point of a predetermined base constellation according to a warp function, as described more fully in U.S. Pat. No. 5,265,127 referred to above. For example, the in-phase and quadrature-phase values of each signal point may be multiplied by a warp multiplier w generated in accordance with the selected warp function.

The warp function is selected to model the inverse of the non-linear component of the transmission channel. For example, in the case of a PCM system, the non-linear component is typically the µ-law characteristic, a logarithmic function of the magnitude of the signal being transmitted. An inverse logarithmic function, or an exponential function, of the magnitude of the transmitted signal would, therefore, be used to warp the constellation. A series approximation to the exponential inverse of the u-law characteristic conveniently may be used as the warp function.

Thus, for a PCM system, the warp multiplier w would be generated in accordance with the warp function $$w=1+(8192P_i+2731P_i^2+683P_i^3+173P_i^4+23P_i^5+3P_i^6)/16384,$$

where $P_i=p_i/g$, $p_i$ is the magnitude of the signal, and g is the warp factor. It should be understood, however, that in its broadest aspects the present invention is not limited to any particular warp function, and the above warp function is intended to be merely exemplary.

Next, as shown in step 105, the sequence of warped signal points is received by a receiver. Once the sequence of warped signal points is received, each signal point is unwarped as shown in step 110. The step of unwarping is performed by applying substantially an inverse of the warp function to each received signal point in a known fashion. Next, as shown in step 120, the dispersion of the received signal points about a sequence of expected signal points is calculated for the unwarped inner and outer points of the constellation, respectively. The sequence of expected signal points represents an approximation to the ideal signal points that would be received if there were no distortion caused by the channel. Once the dispersion is calculated for the inner and outer signal points, the difference in the amount of dispersion or distortion that occurs for the outer and inner signal points is calculated as shown in step 130. Next, as shown in step 140, the value of the warp factor g is adapted according to the amount of dispersion to minimize the effects of the channel non-linearity upon the dispersion. The adapted value of the warp factor is communicated to the encoder, as shown in step 150. Finally, as shown in step 160, the transmitter and receiver are adjusted to use the adapted value of the warp factor for warping and unwarping, respectively, a subsequent sequence of signal points.

Figure 4:
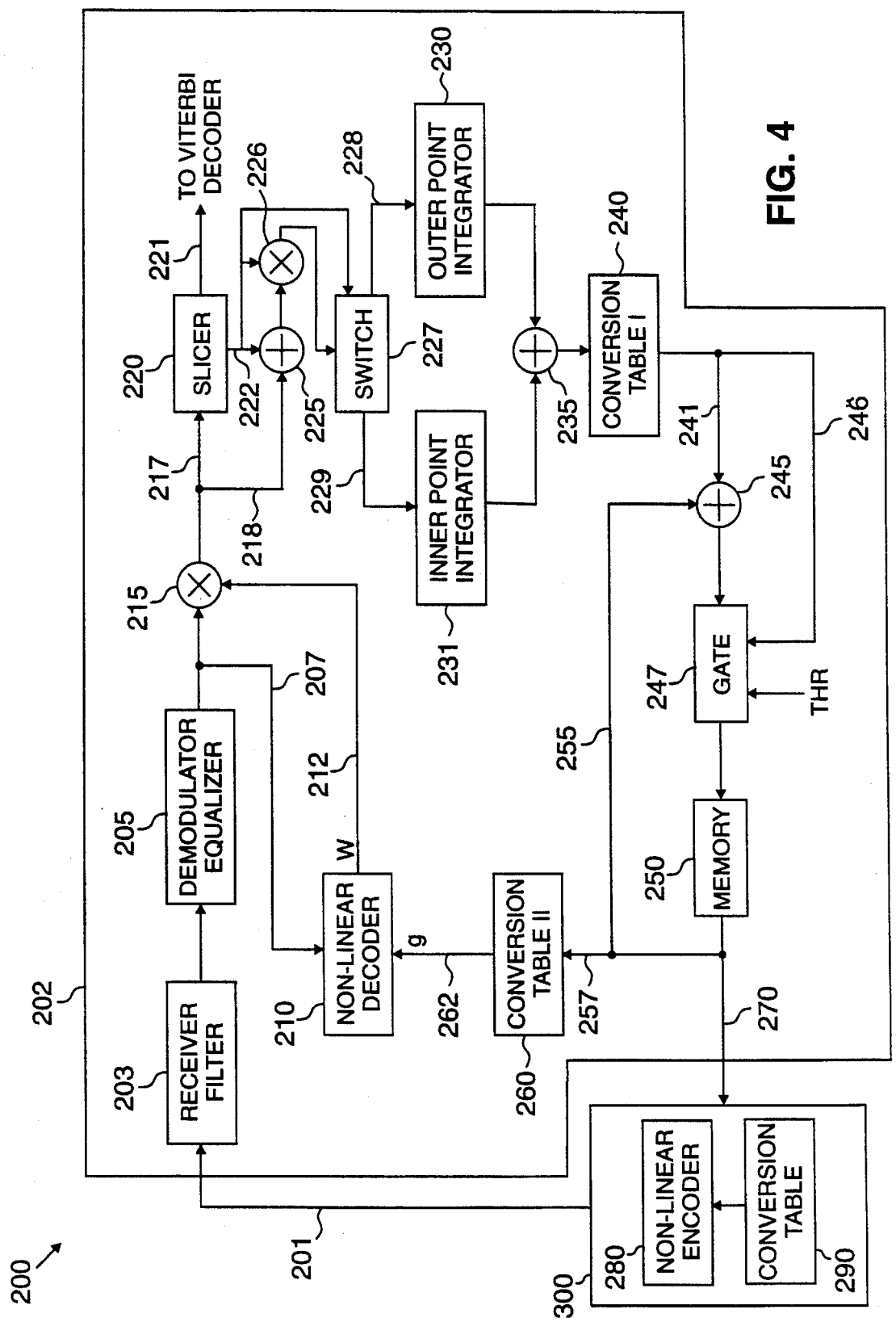
FIG. 4 is a block diagram of a system embodying the principles of the present invention.

FIG. 4 is a block diagram of a system 200 embodying the principles of the present invention. A transmitted line signal including warped signal points is received in a modem receiver 202 from a channel 201 having a non-linear component. In conventional fashion, the received line signal is applied sequentially to a receiver filter 203 and a demodulator/equalizer 205. The output of the demodulator 205 represents a best estimate of the in-phase and quadrature-phase components of the transmitted signal points.

The in-phase and quadrature-phase components are preferably unwarped in the manner described in U.S. Pat. No. 5,265,127 referred to above by multiplying them by an unwarp multiplier W in a multiplier 215. The unwarp multiplier W is generated by a non-linear decoder 210, which provides the multiplier W on lead 212 to the multiplier 215. As more fully described in the above-mentioned patent, the non-linear decoder generates the unwarp multiplier W according to substantially the inverse of the warp function which depends upon the magnitude of the received signal as well as the value of the warp factor g. The magnitude of the received signal may be calculated in the decoder 210 based upon the values of the in-phase and quadrature-phase components received from the demodulator 205 via lead 207. The value of the warp factor g may be received by the non-linear decoder 210 via lead 262 as will be described more fully below.

The unwarped in-phase and quadrature-phase values from the output of the multiplier 215 are applied to a slicer 220 via lead 217. The slicer 220 determines for each unwarped signal point the in-phase and quadrature-phase values of an expected or ideal signal point that would be received if there were no distortion caused by the channel. One output of the slicer 220 may be sent via lead 221 to a Viterbi decoder for further processing and decoding. The components of FIG. 4 described above are more fully described in U.S. Pat. No. 5,265,127 referenced above.

The technique of the present invention assumes that, in an ideal situation, there would be approximately no difference in the amount of dispersion or distortion between signal points at the center and the perimeter of the constellation. According to the principles of the present invention, the unwarped in-phase and quadrature-phase values from the output of the multiplier 215 are also sent to one input of a comparator 225 via lead 218. A second input of the comparator 225 receives the ideal in-phase and quadrature-phase values from the slicer 220 via lead 222. The comparator 225 calculates a quantity which represents the distance between the signal point corresponding to the unwarped in-phase and quadrature-phase values received on lead 218 and the expected signal point corresponding to the values received on lead 222. The quantity calculated by the comparator 225 may be represented, for example, in the form of a voltage signal, which corresponds to an error signal or distortion that results from the non-linear characteristic of the channel.

In a preferred embodiment, the normalized radial component of the dispersion or distortion is calculated. The real part of the ideal signal point on lead 222 is multiplied by the real part of the output of the comparator 225, and the imaginary part of the ideal signal point on lead 222 is multiplied by the imaginary part of the output of the comparator 225. The two products are then added together, and the sum of the products is divided by the magnitude of the signal on lead 222. A processor 226, which receives as inputs the ideal signal point on lead 222 and the output of the comparator 225, may be used for performing these multiplying, adding and dividing functions.

The output of the comparator 225 or, in the preferred embodiment, the normalized radial component from the processor 226, is sent to a switch 227. If the signal point is represented by an outer point on the perimeter of the constellation, the switch 227 sends the output of the comparator 225 to an outer point integrator 230 via lead 228. Similarly, if the signal point is represented by an inner point at the center of the constellation, then the switch 227 sends the output of the comparator 225 to an inner point integrator 231 via lead 229. In one embodiment, the switch 227 may distinguish between inner and outer points, for example, according to the power of the signal on lead 222, because signals represented by inner points are transmitted at a relatively low power, whereas signals represented by outer points are transmitted at a relatively high power. If the V.34 modem standard is used, then the ring index $M_{i,j,k}$, known from the shaping by rings technique, may be used to distinguish between inner and outer points. The shaping by rings technique is described more fully in U.S. Pat. No. 5,115,453, assigned to the assignee of the present invention and incorporated by reference herein. In the embodiment utilizing the V.34 standard, the ring index would be taken from lead 221. Inner points would be represented by a ring index having the lowest values, and outer points would be represented by a ring index having the highest values.

The integrators 230 and 231 calculate the logarithmic value of the average power of the signal errors of the outer and inner signal points, respectively, accumulated over a statistically significant period of time. The period over which the signal points are accumulated depends, in part, on the size of the constellation. For voice band-width applications, however, this period typically may range from several seconds to several minutes. Other applications may require shorter or longer periods. The integrators 230 and 231 thus calculate an average dispersion about the sequence of expected signal points for two sets of unwarped signal points corresponding, respectively, to outer and inner signal points of the constellation.

The values calculated by the integrators 230 and 231 serve as inputs to another comparator 235 which computes the difference between the values calculated by the integrators 230 and 231 by subtracting the value calculated by the integrator 231 from the value calculated by the integrator 230. The value computed by the comparator 235 thus represents, on a logarithmic scale, the ratio of the average power of the outer point signal errors to the average power of the inner point signal errors. Furthermore, this ratio provides an indication of whether the present amount of warping or compression is appropriate, too small, or excessive. If, for example, the amount of compression currently being used were ideal, then the ratio obtained at the output of the comparator 235 would be equal to zero. It should be noted, however, that in cases using Trellis coding, the ideal value may be slightly negative. The negative value results because there are more signal constellation points on the perimeter of a circular constellation than in the center of the constellation.

The value computed by the comparator 235 is sent to a first conversion table 240, which may be, for example, a read-only or read-write memory unit. In the presently preferred embodiment, the first conversion table 240 converts each value provided to it by the comparator 235 to an integer value based upon a linear or an approximately linear scale by quantizing the output of the comparator 235. Integer values ranging, for example, from −15 to +15 may be conveniently used, although other ranges of integer values may also be employed. Each integer value, therefore, corresponds to a particular range of values for the logarithmic ratio of the outer to inner signal error power. Conveniently, a value of zero at the output of the comparator 235 may, for example, be converted to the integer zero, representing no change in the amount of warping or compression desired. Use of the conversion table 240 serves to limit the number of discrete warp values, resulting in less data that must be sent to a remote transmitter 300 which encoded and transmitted the signals received by the receiver 202 via the channel 201.

The integer value obtained from the first conversion table is then sent, via lead 241, to an adder 245 which adds this integer value to an integer value stored in a memory unit 250. The integer value stored in the memory unit 250 may be received by the adder 245 via lead 255 and corresponds to the warp factor g that is currently being used by the transmitter 300 and receiver 202, as will be further explained below. The sum obtained from the adder 245 corresponds to a warp factor g that represents the total amount of warping or compression that would result in approximately no dispersion between the outer and inner signal points after transmission by the transmitter 300 and unwarping by the decoder 202. The adder 245, as well as the comparators 225 and 235, may be implemented, for example, using commercially available AT&T DSP-16A signal processors. This device can also perform the functions performed by the multiplier 215 and the component 226. The aforementioned processor also has conditional branches and memory pointer registers to implement switching functions, such the switching function performed by the switch 227.

Figure 2:
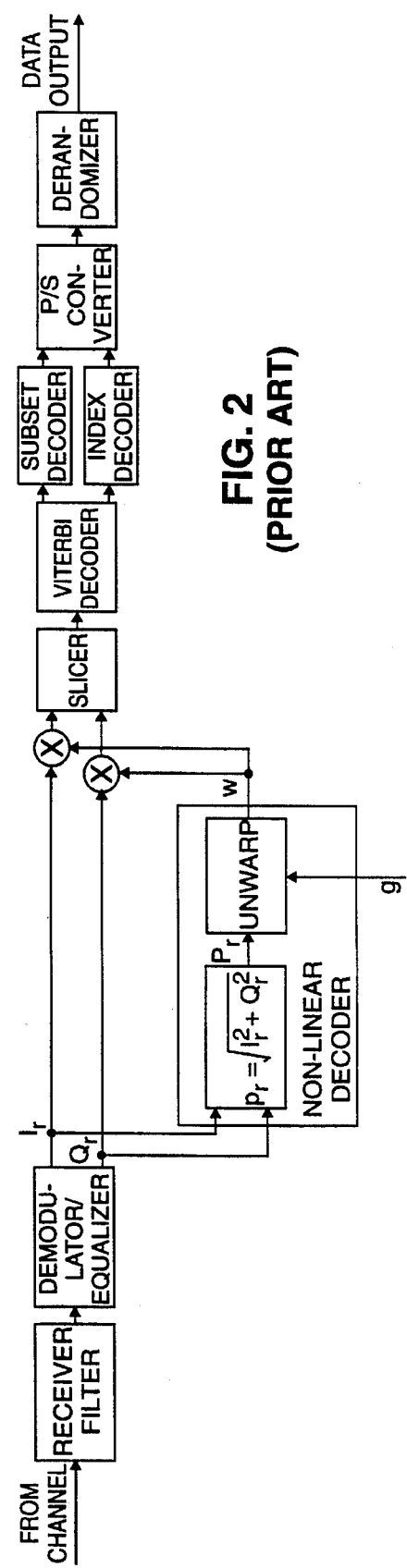
FIG. 2 is a block diagram of known modem receiver.

In the preferred embodiment of the present invention as shown in FIG. 2, a new or updated warp factor g that corresponds to the sum obtained from the adder 245 is not automatically used. Rather a determination is made whether a change in the value of the warp factor g is warranted. The integer value obtained from the first conversion table 240 is thus sent via lead 246 to a gate 247 which may also be implemented, for example, by an AT&T DSP-16A processor. The gate 247 also receives as inputs a predetermined threshold value (THR) and the sum obtained from the adder 245. If the integer value received from the first conversion table 240 is greater than the threshold value (THR), then the gate 247 allows the sum obtained from the adder 245 to pass to the memory unit 250 where it is stored and where it replaces the previously stored value. The threshold value (THR) may be selected to represent a significant change in throughput and to minimize unnecessary changes to the warp factor g that would otherwise be caused by ambient variations in the integrators 230 and 231.

The integer value currently stored in the memory unit 250 is then sent via lead 257 to a second conversion table 260 which also may be a read-only or a read-write memory unit. The conversion table 260, which may be generated experimentally, converts the value received from the memory unit 250 to a corresponding warp factor g. The warp factor g obtained from the conversion table 260 is the new or updated warp factor that is sent to the non-linear decoder 210 via lead 262.

Figure 1:
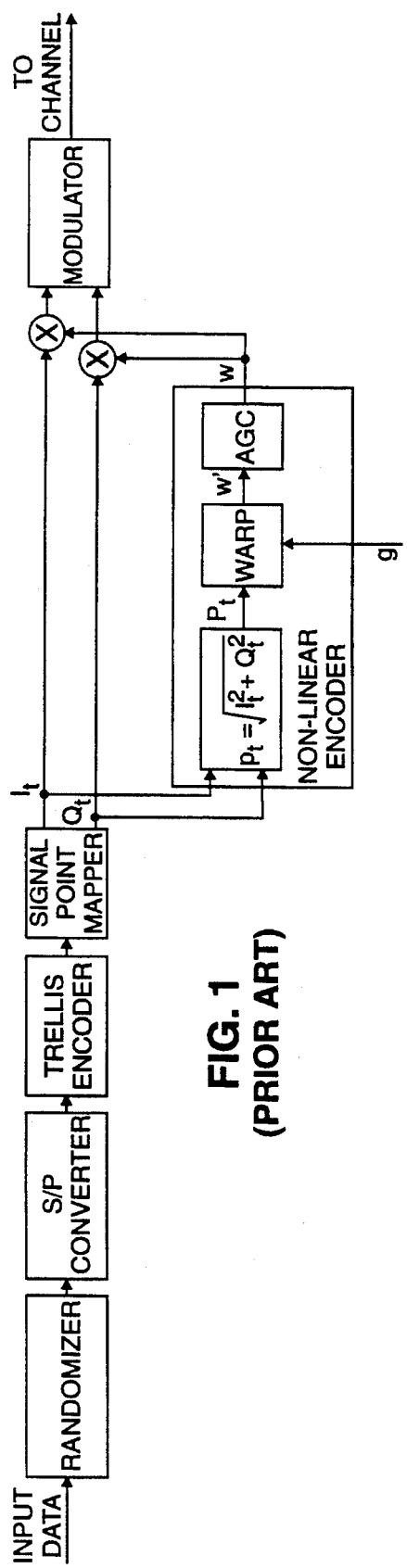
FIG. 1 is a block diagram of a known modem transmitter.

The new or updated warp factor g is also sent to a remote encoder 280 which generated the warped signal points and which forms a component of the transmitter 300. The transmitter 300 may be, for example, the modem transmitter shown in FIG. 1 which is more fully described in U.S. Pat. No. 5,265,127, referred to above. The updated warp factor may be sent, for example, via conventional diagnostic channel communications between the two modems represented by line 270. The methods described in the V.32bis or V.34 modem standards may be used to transfer this information and to synchronize the encoder 280 and decoder 210 so that the decoder 210 uses the same value of the warp factor g to unwarp received signal points as the encoder 280 used to warp the same signal points. In the V.34 modem, for example, the updated value of the warp factor may be sent in the MP sequence in the same manner used to transfer precoder coefficients. In accordance with the principles of the present invention, the encoder 280 is connected to a conversion table 290 that is identical to the second conversion table 260. The conversion table 290 allows the encoder 280 to adjust or update automatically the value of the warp factor that will be used to warp a subsequent sequence of signal points.

It may be noted that the current V.34 standard uses a warp factor, as defined therein, with a value of either 0.3125 or zero. According to the principles of the present invention, the warp factor may take on a range of values from zero to one. Values greater than one are also possible, although a more complex encoder would be required.

Furthermore, it should be noted that certain modems, such as the AT&T Paradyne 3400 series modems, use different outer points for different data rates. The contents of the first look up table 240, therefore, may be different for different data rates. It should also be noted that an adjustment to the value of the warp factor g may result in changes to the total average power due to the non-linearities in the channel. Preferably, therefore, the gain of the signals is adjusted at the transmitting encoder to compensate for such changes so as to maintain an approximately constant average power. One such gain correction factor is described more fully in W. Betts, "Nonlinear Encoding by Surface Expansion," Int'l Conf. on Data Transmission, Publication No. 356 (Sep. 1992), which is incorporated herein by reference. This publication describes a gain correction factor for use in the transmitter when the warp function is a series approximation to the hyperbolic sine function.

The principles of the present invention may also be used to determine whether signal distortion is related to the distance from the constellation center in a non-linear manner and to adjust the value of the warp factor accordingly. In particular, a plurality of integrators, similar to the integrators 230, 231, would be used to measure the average dispersion for multiple sets of signal points where each set of signal points is defined by its distance from the center of the constellation. As before, the comparator 235 would be used to compute the difference between the average dispersion for pairs of signal point sets. For example, the comparator 235 would compute the difference between the average dispersion of the inner-most points on the constellation and the average dispersion of each other set of signal points. The values thus computed by the comparator 235 would be sent to the conversion table 240 which would provide an output indicative of the change in the amount of warping desired. The contents of the table 240 may be experimentally determined so as to discriminate between first, second, third or higher order harmonics in the distortion and so as to provide an optimal output indicative of the change in the amount of warping desired. It should be noted that in this situation, the relationship between the inputs and output of the table 240 will often be non-linear. The output of the table 240 would then be used as described above to update the value of the warp factor g whenever a threshold value is met.

It should also be noted that although the conversion tables 240, 260 and 290 may conveniently be implemented as memory units, they may also be implemented by other means, such as a processor which performs the conversion according to an experimentally determined equation. Integrated circuits may also suitably be used to perform specified functions of the system 200. It will be appreciated, therefore, that, although the present invention has been described with reference to specific embodiments, other arrangements within the spirit and scope of present invention will be readily apparent to persons of ordinary skill in the art. The present invention is, therefore, limited only by the appended claims.

We claim:

1. A data recovery apparatus for recovering data from a sequence of warped signal points received from a transmitter via a non-linear transmission channel, each of the warped signal points being related to a respective signal point of a predetermined base constellation in accordance with a warp function having a warp factor as an independent variable, where the apparatus comprises:

means for unwarping each of the received signal points using substantially an inverse of the warp function;

means for computing the ratio of the average dispersion of unwarped signal points related to outer signal points of said constellation and the average dispersion of unwarped signal points related to inner signal points of said constellation;

means for updating the value of the warp factor used by said unwarping means according to the ratio computed by said computing means; and means for communicating the updated value of the warp factor to said transmitter.

2. The apparatus of claim 1 wherein said ratio is computed using a logarithmic scale.

3. The apparatus of claim 2 wherein said computing means comprises means for calculating said average dispersions about respective sequences of expected signal points.

4. The apparatus of claim 3 wherein said calculating means includes means for calculating said average dispersions using a logarithmic scale.

5. The apparatus of claim 1 wherein said updating means comprises:

a first conversion table for converting the ratio computed by said computing means to an integer value indicative of the change in the amount of warping desired;

a memory unit for storing an integer corresponding to the value of the warp factor currently being used by said transmitter and said unwarping means;

an adder for adding said integer value to the integer stored in said memory unit so as to result in a sum; and a second conversion table for converting said sum to the updated value of the warp factor, where said updated value may be sent to said unwarping means.

6. The apparatus of claim 5 wherein the updated value of the warp factor is sent to said unwarping means and communicated to said transmitter only if said integer value exceeds a predetermined threshold value.

7. The apparatus of claim 6 wherein said first conversion table converts said ratio to an integer value based upon a linear scale.

8. The apparatus of claim 5 wherein the change in the amount of warping desired would result in approximately no difference in the amount of dispersion that occurs between inner and outer signal points in a subsequent sequence of transmitted and unwarped signal points.

9. The apparatus of claim 1 wherein the communicating means comprises means for synchronizing the transmitter and said unwarping means so that said unwarping means uses the same value of the warp factor to unwarp a sequence of received warped signal points as the transmitter uses to generate the same sequence of warped signal points.

10. A method of recovering data from a sequence of warped signal points received from a transmitter via a non-linear transmission channel, each of the warped signal points being related to a respective signal point of a predetermined base constellation in accordance with a warp function having a warp factor as an independent variable, where the method comprises the steps of:

unwarping each of the received signal points using substantially an inverse of the warp function;

computing the ratio of the average dispersion of unwarped signal points related to outer signal points of said constellation and the average dispersion of unwarped signal points related to inner signal points of said constellation;

updating the value of the warp factor to be used in a subsequent step of unwarping according to the ratio computed by said computing means; and communicating the updated value of the warp factor to said transmitter.

11. The method of claim 10 wherein said ratio is computed using a logarithmic scale.

12. The method of claim 11 wherein the step of computing comprises the step of calculating said average dispersions about respective sequences of expected signal points.

13. The method of claim 12 wherein said average dispersions are calculated using a logarithmic scale.

14. The method of claim 10 wherein the step of updating comprises the steps of:

converting said ratio to an integer value indicative of the change in the amount of warping desired;

adding said integer value to an integer corresponding to the value of the warp factor currently being used by said transmitter and currently being used in said step of unwarping; and converting the result obtained from said step of adding to the updated value.

15. The method of claim 14 wherein the updated value of the warp factor is used in a subsequent step of unwarping only if said integer value exceeds a predetermined threshold value and wherein said step of communicating is performed only if said integer value exceeds the predetermined threshold value.

16. The method of claim 15 wherein the step of converting said ratio to an integer value is based upon a linear scale.

17. The method of claim 14 wherein the change in the amount of warping desired would result in approximately no difference in the amount of dispersion that occurs between inner and outer signal points in a subsequent sequence of transmitted and unwarped signal points.

18. The method of claim 10 wherein the step of communicating comprises the step of synchronizing said transmitter such that the value of the warp factor used in a step of unwarping a subsequent sequence of received signal points is the same as the value used by said transmitter to generate the same subsequent sequence of signal points.

19. A system for transmitting data comprising:
a transmitter modem for transmitting a sequence of warped signal points, where each of the warped signal points is related to a respective signal point of a predetermined base constellation in accordance with a warp function having a warp factor as an independent variable;
a non-linear transmission channel;
a receiver modem for receiving the sequence of warped signal points via said transmission channel, where said receiver modem comprises:
(a) means for unwarping each of the received signal points using substantially an inverse of the warp function;
(b) means for computing the ratio of the average dispersion of unwarped signal points related to outer signal points of said constellation and the average dispersion of unwarped signal points related to inner signal points of said constellation;
(c) means for updating the value of the warp factor used by said unwarping means according to the ratio computed by said computing means; and
(d) means for communicating the updated value of the warp factor to said transmitter.

20. The system of claim 19 wherein the means for computing said ratio comprises:
a slicer for determining an expected signal point that would be received for each unwarped signal point if no distortion were caused by said transmission channel to said signal point;
at least two integrators for respectively calculating on a logarithmic scale the average dispersion about a sequence of expected signal points for unwarped signal points related, respectively, to inner and outer points of said constellation; and
a comparator for determining the difference between the average dispersions calculated by said integrators.

21. The system of claim 20 wherein the means for updating comprises:
a first conversion table for converting said difference to a corresponding integer value indicative of the change in the amount of warping desired;
a memory unit for storing an integer corresponding to the value of the warp factor currently being used by said transmitter modem and said unwarping means;
an adder for adding said integer value to the integer stored in said memory unit so as to result in a sum; and
a second conversion table for converting said sum to the updated value of the warp factor, where said updated value may be sent to said unwarping means.

22. The system of claim 21 in which said sum is stored in said memory unit and replaces the previous integer stored in said memory unit, where said sum is communicated to said transmitter modem, and where said transmitter modem further comprises a conversion table whose contents are identical to the contents of said second conversion table.

23. The system of claim 22 further comprising a gate for allowing said sum to be sent to said second conversion table and to said transmitter modem only if said integer value obtained from said first conversion table exceeds a predetermined threshold value.

24. A data recovery apparatus for recovering data from a sequence of warped signal points received from a transmitter via a non-linear transmission channel, each of the warped signal points being related to a respective signal point of a predetermined base constellation in accordance with a warp function having a warp factor as an independent variable, where the apparatus comprises:
a non-linear decoder for unwarping each of the received signal points using substantially an inverse of the warp function;
a processor for computing the ratio of the average dispersion of unwarped signal points related to outer signal points of said constellation and the average dispersion of unwarped signal points related to inner signal points of said constellation and for updating the value of the warp factor used by said decoder according to said ratio; and
means for communicating the updated value of the warp factor to said transmitter.

25. A system for transmitting data comprising:
a transmitter modem for transmitting a sequence of warped signal points, where each of the warped signal points is related to a respective signal point of a predetermined base constellation in accordance with a warp function having a warp factor as an independent variable;
a non-linear transmission channel;
a receiver modem for receiving the sequence of warped signal points via said transmission channel, where said receiver modem comprises:
(a) a non-linear decoder for unwarping each of the received signal points using substantially an inverse of the warp function;
(b) a processor for computing the ratio of the average dispersion of unwarped signal points related to outer signal points of said constellation and the average dispersion of unwarped signal points related to inner signal points of said constellation and for updating the value of the warp factor used by said decoder according to said ratio; and
(c) means for communicating the updated value of the warp factor to said transmitter.

* * * * *